United States Patent [19]
Thies et al.

[11] Patent Number: 5,097,012
[45] Date of Patent: Mar. 17, 1992

[54] SOLVENT EXTRACTION OF FATTY ACID STREAM WITH LIQUID WATER AND ELEVATED TEMPERATURES AND PRESSURES

[75] Inventors: Mark C. Thies; Joseph C. Mullins; Jose A. Briones, all of Clemson, S.C.

[73] Assignee: Clemson University, Clemson, S.C.

[21] Appl. No.: 468,582

[22] Filed: Jan. 23, 1990

[51] Int. Cl.$^5$ ............... C09F 8/07; C09F 1/02; C09F 1/00
[52] U.S. Cl. ............... 530/256; 530/207; 530/208; 530/209; 585/332; 860/412.8
[58] Field of Search ............ 530/205, 208, 231, 206, 530/207, 208, 209; 552/545; 549/413; 244/218; 585/332; 260/412.8

[56] References Cited

U.S. PATENT DOCUMENTS

| | | | |
|---|---|---|---|
| 2,499,430 | 3/1950 | Vogel et al. | 552/545 |
| 2,530,809 | 11/1950 | Christenson et al. | 244/218 |
| 2,530,810 | 11/1950 | Christen et al. | 552/545 |
| 2,547,208 | 4/1951 | Hasselstrom et al. | 530/205 |
| 2,558,543 | 6/1951 | Davis et al. | 530/208 |
| 2,573,890 | 11/1951 | Christenson et al. | 530/207 |
| 2,594,343 | 4/1952 | Pines | 585/332 |
| 2,866,781 | 12/1958 | Chase et al. | 530/208 |
| 3,803,114 | 4/1972 | Mitchell et al. | 530/205 |
| 3,804,819 | 4/1974 | Wengrow et al. | 530/208 |
| 3,840,570 | 10/1974 | Julian | 552/545 |
| 3,887,537 | 6/1975 | Harada et al. | 530/208 |
| 3,926,936 | 12/1975 | Lehtinen | 530/208 |
| 3,943,117 | 3/1976 | Force | 530/231 |
| 3,965,085 | 6/1976 | Holmbom et al. | 530/208 |
| 4,076,700 | 2/1978 | Harada et al. | 530/206 |
| 4,151,160 | 4/1979 | Koebner | 530/209 |
| 4,422,966 | 12/1983 | Amer | 530/205 |
| 4,422,974 | 12/1983 | Hamunen | 552/545 |
| 4,454,329 | 6/1984 | Takagi et al. | 549/413 |
| 4,483,791 | 11/1984 | Phillips, Jr. et al. | 530/208 |
| 4,495,094 | 1/1985 | Cleary | 530/205 |
| 4,496,478 | 1/1985 | Kulkarni et al. | 530/205 |
| 4,519,952 | 5/1985 | Cleary et al. | 260/412.8 |
| 4,524,024 | 6/1985 | Hughes | 530/205 |
| 4,594,437 | 6/1986 | Sampathkumar | 549/413 |

OTHER PUBLICATIONS

*Bailey's Industrial Oil and Fat Products*, vol. 1, 4th Edition.

Primary Examiner—Maurice J. Welsh
Assistant Examiner—Duc Truong
Attorney, Agent, or Firm—Dority & Manning

[57] ABSTRACT

A process for producing increased concentrations of valuable neutrals such as sterols and tocopherols from fatty and/or resin acid-containing streams, such as tall oil and vegetable oil distillate, employs liquid water at elevated temperatures and pressures. The neutrals are concentrated by extracting fatty acids as well as resin acids of high purity. Temperature-dependent solubility differences allow for the further separation of resin acids from fatty acids.

32 Claims, 5 Drawing Sheets

SOLVENT EXTRACTION OF FATTY ACID STREAM WITH LIQUID WATER AND ELEVATED TEMPERATURES AND PRESSURES

This invention was made with Government support under Grant No. CBT-8809422 awarded by the National Science Foundation. The Government has certain rights in this invention.

BACKGROUND OF THE INVENTION

The present invention relates to extraction processes and more particularly to the use of liquid water at elevated temperatures and pressures as a solvent for the liquid-liquid extraction of a stream containing fatty acids and/or resin acids.

The fact that fatty acids can become completely soluble in liquid water at elevated temperatures has been known for at least 40 years (see *Bailey's Industrial Oil and Fat Products*, Volume 1, 4th Ed.).

Crude tall oil is a major by-product of the Kraft pulping process for making paper. The primary components are fatty acids, resin acids, and neutrals. In the prior art, resin acids are often referred to as rosin acids, and neutrals are typically indicated as unsaponifiables or non-saponifiables as they lack an acid group and therefore are not subject to saponification. The most valuable of the neutrals found in tall oil are the sterols, high molecular weight alcohols of biological importance.

The most widely used prior art method for recovering the acid components of tall oil is vacuum distillation. However, the major disadvantage of such process is that the sterols cannot be directly recovered. Most of the sterols present react with fatty and resin acids by esterification to form a heavy, low value residue known as pitch. Such reaction also decreases the quantity of fatty and resin acids recovered. Further, the unreacted sterols end up as impurities in the recovered resin acid streams. Northern and hardwood trees, which are now being used with greater frequency by the paper pulping industry, have a relatively high sterols content such that pitch formation and acid contamination is even greater when these raw woods are processed.

Thus, it is generally known in the prior art that sterols and other neutrals are best recovered by removal before distillation. Christenson et al U.S. Pat. No. 2,530,809 discloses a process for the fractionation of tall oil prior to distillation. Generally, tall oil, if not already present as such, is converted to a tall oil soap with fatty and resin acids present as soaps; neutrals (unsaponifiables), including sterols, are unchanged. The tall oil soap is mixed with a lower alcohol and subjected to an extraction with an organic phase which is immiscible with the soap solution but which acts as a solvent for the unsaponifiable neutrals. The neutral-free soaps are then converted to free fatty acids and free resin acids and are separated by conventional vacuum distillation. The neutrals are washed and stripped to eliminate the solvent.

Other patents which have employed this general scheme for the separation of tall oil into its various constituents include Hasselstrom et al U.S. Pat. No. 2,547,208, which discloses a method for refining tall oil soap employing ketones as a solvent for the undesirable neutrals; Chase et al U.S. Pat. No. 2,866,781, which discloses a method of separating non-acids from soap stocks in which an aqueous solution of soap is subjected to extraction with an ester solvent for the removal of unsaponifiable material; and Metchel et al U.S. Pat. No. 3,803,114, which discloses a process for purifying tall oil to produce unsaponifiable-free tall oil products wherein the unsaponifiables are extracted into a hydrocarbon phase. In Holmbom et al U.S. Pat. No. 3,965,085, a method for refining soaps using solvent extraction is disclosed in which the soap solution is first mixed with a low molecular weight ketone before the addition of a water-immiscible solvent such as hexane. The extracted soap phase is then distilled for removal of the ketone.

Cleary U.S. Pat. No. 4,495,094 discloses a process for separating fatty and resin acids from unsaponifiables in which the tall oil is not converted to a soap but is merely contacted with a solvent comprising an alcohol and water solution at room temperature which is selective for and extracts the fatty and/or resin acids. Kulkarni et al U.S. Pat. No 4,496,478 discloses a process for extracting unsaponifiables from fatty and rosin acids wherein an emulsion is formed with an organic solvent and an emulsifying liquid. A formation of three phases is effected by the application of centrifugal force. The three phases, an organic solvent phase containing the fatty acids, an emulsifying liquid phase, and a semi-solid sludge phase, are then separated.

Various patents are directed to the recovery of sterols and acids from the pitch produced during the distillation of tall oil. Generally, this pitch is treated by methods similar to those discussed above. It is converted to a soap and extracted with a solvent to remove the unsaponifiable matter. Christenson et al U.S. Pat. No. 2,530,810 discloses such a process wherein the soaps are dissolved in an alcohol prior to extraction by a hydrocarbon. The neutrals are then washed and stripped of the hydrocarbon solvent. Julian U.S. Pat. No. 3,840,570 discloses a process for preparing sterols from tall oil pitch wherein the pitch is dissolved in a solvent mixture of alcohol and hydrocarbon. Water, at temperatures ranging from 32° F. to 212° F., is then added to extract the acid soaps. The hydrocarbon phase, which contains the sterol esters, is saponified and the free sterols are recovered. In Lihtinen U.S. Pat. No. 3,926,936, the pitch is saponified at a temperature of 200°–300° C. The reaction product soaps are then acidified to produce an oil. The oil is distilled, and the distillate may be further refined by previously known fraction distillation processes. By such method, the sterols are dehydrated to form hydrocarbons, and the fatty and resin acids are recovered. Force U.S. Pat. No. 3,943,117 discloses a method for saponifying pitch in the presence of an amine catalyst to produce fatty and resin acid soaps. Harada et al U.S. Pat. No. 3,887,537 discloses a process for recovering fatty acids and rosin acids following pitch saponification by thin film evaporation.

Amer U.S. Pat. No 4,422,966 discloses a process for separating neutral compounds from tall oil soaps wherein the soap is contacted with a supercritical fluid solvent for the tall oil neutral compounds such that neutrals are extracted into the solvent. Preferably, the solvents employed by the Amer process are hydrocarbon gases which are exposed to supercritical conditions of temperature and pressure. Gases disclosed as suitable for the process include methane, ethane, propane, butane, ethylene, propylene and the like. One problem encountered in recent supercritical fluid extraction systems such as that of Amer has been the very low solubilities which many compounds of low volatility, particularly those which contain polar substituent groups, exhibit in supercritical gases. These low solubilities mean that the solvent recycle rates in a supercritical extraction process are very high such that the economics are less attractive.

Hughes U.S. Pat. No. 4,524,024 discloses a process of enhancing the recovery of fatty acids from tall oil pitch. Added to the generally known vacuum distillation process is an additional hydrolysis step. During this intermediate step, a pitch fraction is fed into a hydrolyzer at a pressure of from 40 kg/cm$^2$ to 70 kg/cm$^2$ where it is subjected to water having a temperature of from 260° C. to 280° C. During the hydrolysis step, free fatty acids are derived by hydrolytic splitting of the esterified fatty acids present in the pitch fraction. The entire hydrolysis reaction product is fed into the distillation process where the newly freed fatty acids are recovered.

Upon recovery of the neutrals by any of the prior art processes discussed above or by the process of the present invention, purification may be desired. U.S. Pat. Nos. 2,499,430 and 4,422,974 disclose methods for the recovery of sterols of high purity from neutrals.

Another problem to which the present invention is applicable is the purification of the deodorized distillate or sludge formed as a by-product during the deodorization of oils such as soybean oil, linseed oil, cottonseed oil, safflower oil, rice bran oil, corn oil and sunflower oil. Such distillate, like the tall oil discussed above, generally contains fatty acids and neutrals. The more valuable neutral components of the distillates are sterols and tocopherols (Vitamin E). Various methods for removing the fatty acids from the deodorizer distillate have been addressed by the prior art. For example, Takagi et al U.S. Pat. No. 4,454,329 discloses a process wherein the free fatty acids within the distillate are subjected to esterification by the addition of an alcohol. Sampathkumar U.S. Pat. No. 4,594,437 discloses a process whereby the free fatty acids are isolated by the formation of a urea complex.

SUMMARY OF THE INVENTION

The present invention recognizes and addresses the foregoing disadvantages, and others, of prior art recovery and separation techniques. Thus, it is an object of the present invention to provide a method for recovering the sterols from tall oil.

Yet another object of the present invention is to recover the acids from crude tall oil.

Yet another object of the present invention is to provide a method for recovering the sterols from an acid stream that does not require chemical solvents or produce toxic wastes or other environmentally undesirable side effects.

A further object of the present invention is to provide a method for recovering the sterols from tall oil which does not require conversion of the tall oil to a tall oil soap.

Still another object of the present invention is to provide a method for extracting fatty and resin acids from a sterol-containing acid stream that is capable of reducing the amount of sterols in the purified acid stream to less than one percent by weight.

A further object of the present invention is to provide a method for recovering the sterols from an acid stream that is more convenient and less expensive than existing methods.

A further object of the present invention is to provide a method for recovering the acids and sterols from an acid stream such that the formation of pitch in a subsequent acid distillation is significantly reduced.

Still another object of the present invention is to provide a method for removing the fatty acids from a deodorized distillate such that a tocopherol-rich stream is recovered.

Yet another object of the present invention is to provide a method for recovering a tocopherol-rich stream from deodorized distillate that dispenses with the need for organic solvents and chemical reactions.

A further object of the present invention is to provide a method for separating and/or recovering a sterol-rich stream, a fatty acid stream and a resin acid stream from tall oil.

Still a further object of the present invention is to provide a method for recovering a tocopherol-rich stream from the distillate product of the deodorization of vegetable oils derived from soybeans, corn, cottonseed, linseed, sunflower seed, etc.

Yet another object of the present invention is to provide a method for separating a stream containing both fatty acids and resin acids into two streams, one having an increased concentration of fatty acids relative to the primary stream and one having an increased concentration of resin acids relative to the primary stream.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

The present invention employs water at elevated temperatures and pressures as a solvent for separation, by liquid-liquid extraction, of the components of naturally occurring oils and resins. Examples of compositions suitable for separation by the present method include crude tall oil and the distillate by-product of the deodorization of vegetable oils, although other biochemical and synthetic chemical compositions can be separated into their relative components by this invention.

Generally, the objects of the present invention are achieved by providing a method of solvent extraction for separating the components of a primary stream containing fatty and/or resin acids which requires contacting the stream with liquid water at temperatures ranging from 250° C. to 360° C. As a result of this contact, two liquid phases are formed. Thus, an extract phase is formed containing water and those components which are more soluble in water, e.g., the acids. Concurrently, a raffinate phase is formed containing those components which are less soluble in water, e.g., the sterols.

The present method, as applied to tall oil and vegetable oil distillate, requires that the temperature be in the range described above. At lower temperatures, the solubility of the acids in water is so low as to render the process impractical. At higher temperatures, the primary stream of interest and water generally will only form one liquid phase and the method cannot be used. An additional difficulty at elevated temperatures is that significant thermal degradation of the primary stream components will generally occur.

As is generally known in the prior art of liquid-liquid extraction, the operating temperature is generally selected so as to obtain values of $k_D$ and $\beta$ which are as high as possible. For example, for a primary stream consisting of fatty acids and sterols, the distribution coefficient $k_D$ is defined as $$k_D = \frac{\text{wt. fraction fatty acid (extract phase)}}{\text{wt. fraction fatty acid (raffinate phase)}}$$

and the selectivity $\beta$ is defined as $$\beta = \frac{\frac{\text{wt. fraction fatty acid (extract phase)}}{\text{wt. fraction sterols (extract phase)}}}{\frac{\text{wt. fraction fatty acid (raffinate phase)}}{\text{wt. fraction sterols (raffinate phase)}}}$$

As is generally known by those skilled in the art, maximum values of both $k_D$ and $\beta$ do not occur at the same temperature. Therefore, the operating temperature which those skilled in the art will use will depend on the economic value of the primary stream of interest and on the desired purity of the products. An additional consideration for the present method is that the presence of undesirable thermal degradation of the components of interest may also affect the choice of operating temperature.

The present invention provides a method for removing and/or recovering valuable neutrals such as sterols and tocopherols from fatty acid-containing streams such as tall oil and deodorized distillate. A sterol and/or tocopherol-rich stream is produced by extracting off a greater portion of acids along with a lesser portion of neutrals.

Streams which are particularly appropriate for treatment by the present process include crude tall oil and deodorized distillate, the latter being a by-product of deodorization of vegetable oils. Tall oil contains primarily fatty acids, resin acids and neutrals, the most valuable of the neutrals being sterols. The present process is employed to separate the fatty acids and the resin acids, at least partially, from the sterols thereby producing a fatty and resin acid stream and a sterol-enriched stream, and then, if desired, to separate the resin acids from the fatty acids such that three separate streams of product are generated. Deodorized distillates are composed of fatty acids, neutrals and other components. The most valuable neutrals of the distillate are tocopherols; however, sterols are also present. Thus, the process of the present invention is used to separate the fatty acids from the tocopherols, sterols and other components of the distillate. It should be noted that the present process is generally appropriate for the separation of acids (saponifiables) from neutrals (unsaponifiables) in any relevant composition and does not require saponification. More generally, the present process is applicable to the liquid-liquid extraction of those organic molecules having polar substituent groups thereon and which are essentially insoluble in water at ambient temperatures, but which, because of the polar substituent group, become highly soluble in liquid water at elevated temperatures.

Preferably, the present invention is practiced as a continuous, countercurrent liquid-liquid extraction system. The appropriate operating temperatures for extracting a complex chemical mixture such as a natural oil is highly dependent on the composition of the mixture. For example, in the case of tall oil, the operating temperature should be high enough such that acid solubilities are significant in the aqueous phase, but not so high that the tall oil stream to be extracted is completely soluble in water. For example, the solubility of a Southern pine tall oil in liquid water is only 0.1% by wt. at 250° C.; however, it increases to 3.0% by wt. at 300° C. and to 6.0% by wt. at 312° C. At temperatures above approximately 340° C., this tall oil stream is completely soluble in liquid water.

Thus, for such mixture, the preferred operating temperature which yields both good solubilities ($k_D$'s) and selectivities ($\beta$'s) is approximately 300° C. to 330° C. For other tall oil mixtures which contain fewer neutrals than the present mixture, complete solubility in liquid water will occur at lower temperatures and the preferred operating temperature range will necessarily be lower. On the other hand, tall oil derived from Northern and hardwood trees contains more neutrals than the present tall oil, and does not become completely soluble in liquid water until higher temperatures, estimated as 360° C. Thus, higher operating temperatures are feasible.

Similar effects occur depending on the composition of the acids in tall oil. For example, a tall oil richer either in lower molecular weight fatty acids (such as palmitic) or in resin acids is more soluble in water than Southern pine tall oil, and preferable operating temperatures are lower.

Generally, the preferred operating temperature range is that range in which optimum $k_D$'s and $\beta$'s are obtained for the mixture of interest. For the many different types of crude tall oil and deodorized distillate, as well as other acid-containing streams, such operating temperatures will range from 250° C. to 360° C.

A complicating factor in the selection of the appropriate operating temperature for a given stream is that undesirable side reactions, such as the decarboxylation of resin acids, the dehydration of sterols, and esterification become significant enough to have a detrimental effect on product quality as operating temperatures approach 350° C. Thus, it may be preferable to operate at lower temperatures to improve product purity at the expense of reduced solubilities in water. Although the formation of pitch by esterification, the reaction of alcoholic neutrals with the carboxylic acids present, is seen at excessively high temperatures, one advantage of the present invention is that pitch formation is deterred at lower temperatures. The water present in the liquid phases inhibits the formation of esters.

The process of the present invention may also be employed to separate resin acids from fatty acids as noted above. This separation is possible because the resin acids are generally more soluble than tall oil fatty acids in liquid water at elevated temperatures. Depending on the types of fatty and resin acids present, good $k_D$'s and $\beta$'s occur generally within the temperature range of 250° C. to 340° C., and the resin acids are effectively separated and removed from the fatty acids.

Thus, the process of the present invention provides a method for separating the various components of fatty acid and/or resin acid containing compositions.

Other objects, features, and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which.

Repeat use of reference characters in the present specification and drawings is intended to represent same or analogous features or elements of the invention.

DETAILED DESCRIPTION OF THE PREFERRED EMBODIMENTS

Reference will now be made in detail to the present preferred embodiments of the present invention, one or more examples of which are illustrated in the accompanying drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield still a further embodiment. Thus, it is intended that the present invention cover the modifications and variations of this invention provided they come within the scope of the appended claims and their equivalents.

Figure 1:
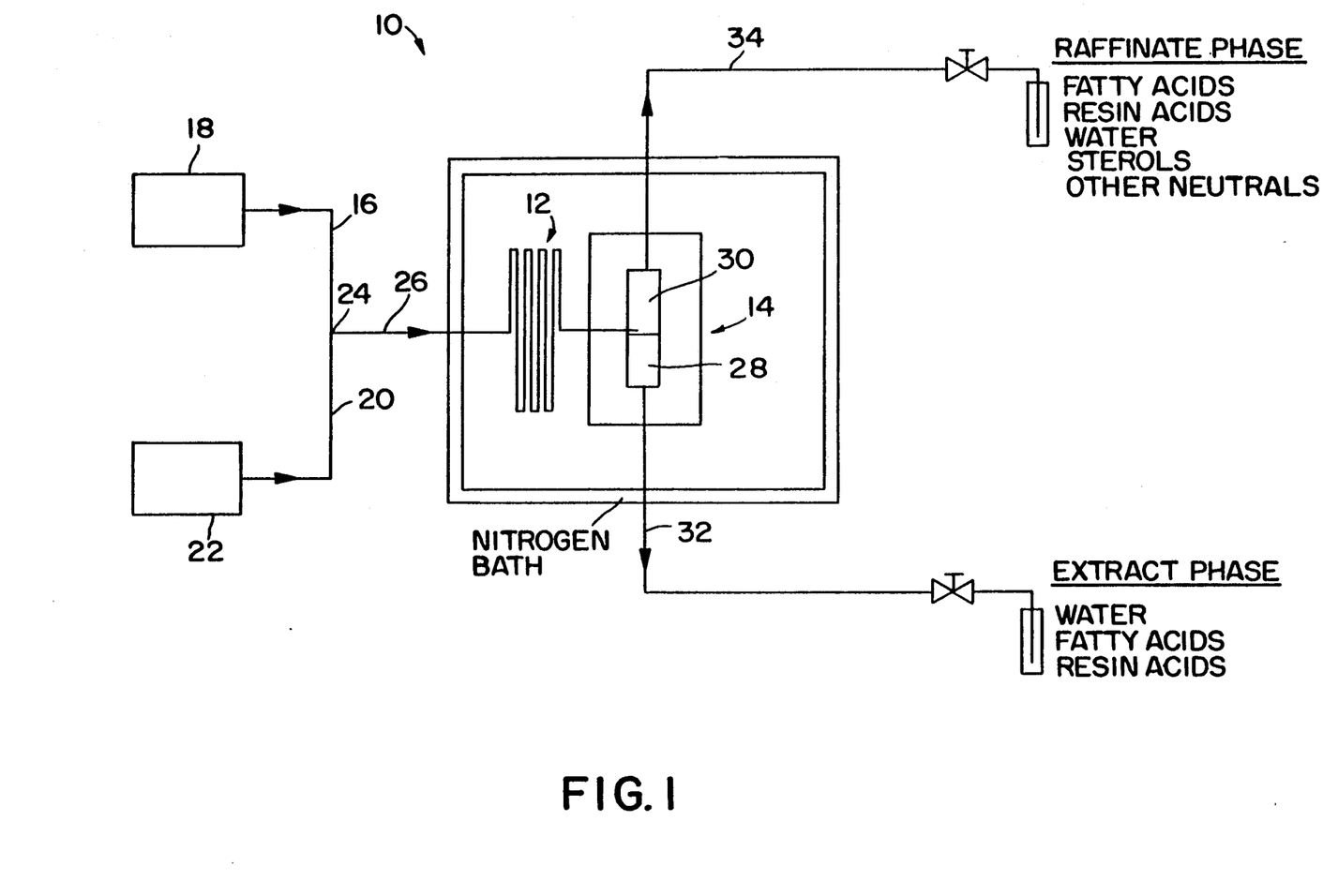
FIG. 1 is a schematic diagram of a solvent extraction system in accordance with the present invention.

A preferred embodiment of the method of the present invention is schematically shown in FIG. 1. The solvent extraction system is generally designated 10 and includes generally a means for contacting the two liquids such as equilibrium coil 12 and a means for separating two phases such as viewing cell 14. A solution having neutrals and acids, such as, for example, tall oil, is forced through line 16 by pump 18. Water flowing through line 20, forced therethrough by pump 22, is mixed with the tall oil at point 24. The mixture flows therefrom through line 26 into equilibrium coil 12 wherein the two solutions are more thoroughly mixed and are heated to operating temperature. The liquid mixture subsequently enters view cell 14 where two phases are allowed to separate. The bottom extract phase, represented generally at 28, is substantially aqueous, containing water and extracted acids. The top raffinate phase 30 is substantially organic, or at least "more organic" in character than the extract phase, as it contains, primarily, neutrals, fatty and resin acids, and water. The two phases exit the view cell, aqueous phase 28 exiting by line 32, and organic phase 30 exiting by line 34. After each phase cools to around 200° C., the respective components are no longer soluble in the liquid water such that water separates from each phase and leaves the organic components. These organics may be further purified. Examples given below illustrate the partial separation achieved by fatty acid and resin acid extraction with the apparatus of FIG. 1.

Figure 2:
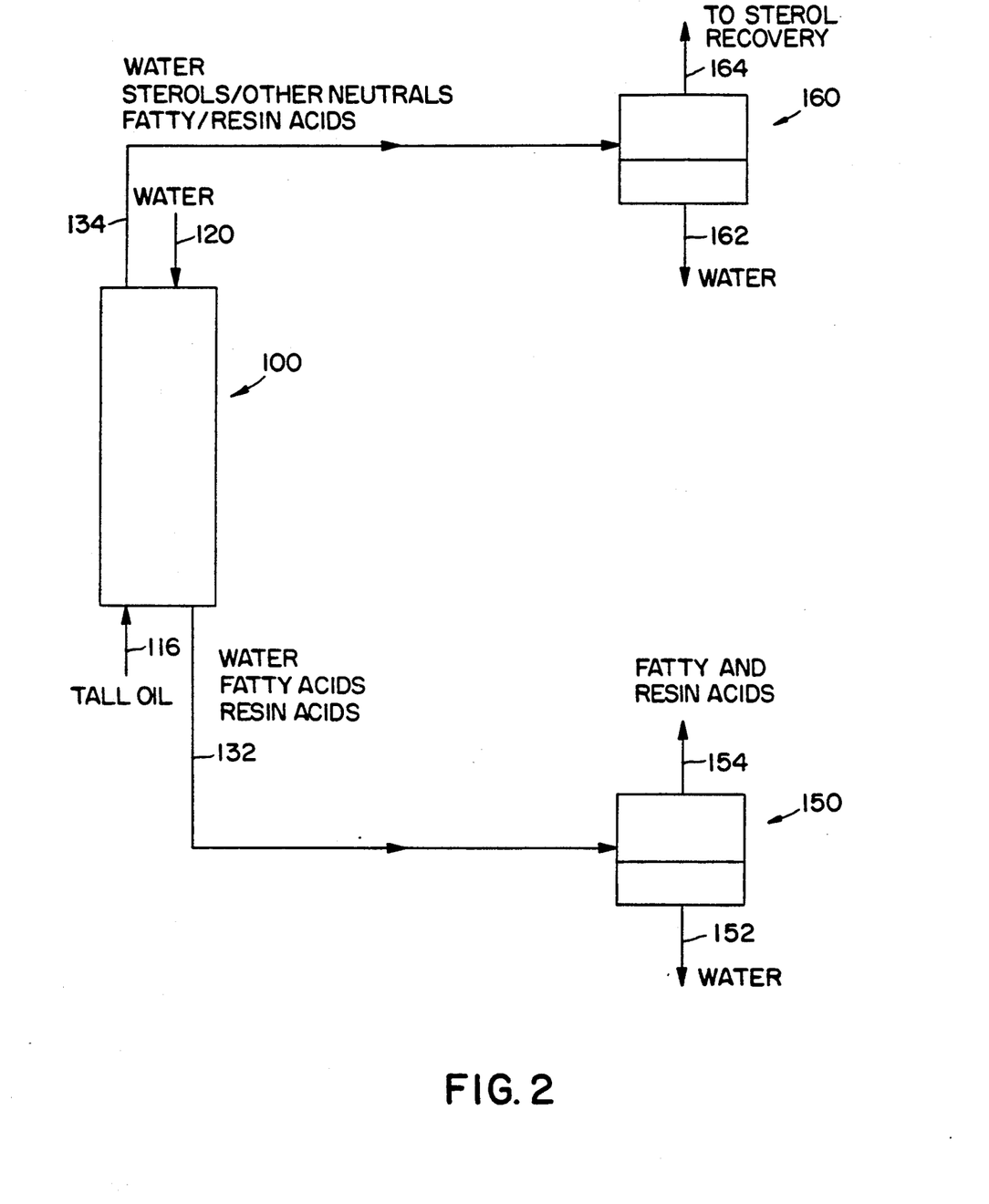
FIG. 2 is a schematic diagram of a countercurrent liquid-liquid solvent extraction system in accordance with the present invention.

It is to be understood that such apparatus, generally employed in laboratory experimentation rather than full-scale production, represents one equilibrium stage for liquid-liquid mass transfer. An equilibrium stage may be thought of as one unit for liquid-liquid contact and inter-phase transfer. The liquid-liquid extraction column of FIG. 2 provides a plurality of equilibrium stages such that greater mass transfer of acids from the tall oil into the aqueous extract phase will occur over the length of the column. Other devices which provide for a plurality of equilibrium stages, such as, for example, mixer-settlers, are also within the scope of the present invention.

Generally, the present process is carried out at operating temperatures ranging from about 250° C. to about 360° C. Accordingly, the pressure must always be maintained above the bubble point pressure of all process streams at any given operating temperature. However, because the vapor pressure of all components, other than water, is very low, in practice the pressure must be maintained above the vapor pressure of water. Although extraction of acids into the aqueous phase appreciably begins around 250° C., solubilities of the fatty acids which occur in tall oil and soybean oil deodorized distillate which are high enough to be practical are generally not achieved until about 280° C. Optimum operating conditions for a Southern pine tall oil are between 280° C. and 330° C.; for a Northern or hardwood tall oil, between 280° C. and 350° C. In this temperature range, both solubilities, or $k_D$'s, and selectivities, or $\beta$'s, are relatively high, and undesirable side reactions are minimal.

As has been discussed before, an absolute upper limit on the operating temperature occurs when the tall oil and water become completely miscible, since two liquid phases must exist for an extraction to be carried out. Depending on the composition of the tall oil, this will occur at temperatures from 320° C. to greater than 360° C. For example, referring to FIG. 3, for the Southern pine tall oil tested, two liquid phases exist up to at least 315° C. It is estimated that only one liquid phase will exist above approximately 340° C.

At temperatures above about 330° C., undesirable side reactions begin to have a detrimental effect on product quality. Above about 350° C., these side reactions become a prohibitive factor, thereby limiting operating temperature range.

One such side reaction which is a common problem in the prior art is the formation of pitch. Pitch is, generally, unwanted esters produced by the reaction of alcoholic neutrals present in the system with carboxylic (fatty and resin) acids. Although pitch is formed by the present process at excessively high temperatures, pitch formation is low up to about 330° C., presumably because the water present in both phases inhibits the formation of esters. Other undesirable side reactions which occur at excessive temperatures include the decarboxylation of resin acids and the dehydration of sterols. These reactions are limited by maintaining an operating temperature below about 350° C. and are minimized by maintaining an operating temperature below about 330° C. Thus, optimum extraction of fatty and resin acids from a Southern pine tall oil is achieved between about 280° C. and about 330° C.; for a Northern or hardwood tall oil between 280° C. and 350° C.

Further, it is within the scope of the present invention to either bring the tall oil into contact with water at room temperature and then heat the two or to heat the water and/or the tall oil prior to mixing such that the mixture is at the appropriate temperature. However, in order to prevent the reaction of tall oil, any heating of the oil in the absence of water should be limited in time and degree. Generally, the apparatus of FIG. 1 allows for the former method of heating while the apparatus of FIG. 2 requires, at least in part, the latter. However, regardless of the heating method employed, the pressure must be maintained above the vapor pressure of water at every temperature attained in order to maintain the water in its liquid state.

Similarly, the process of the present invention may be used to separate the components of the distillate obtained during the deodorization of various vegetable oils. The fatty acids present in such distillate may be extracted at temperatures ranging from about 250° C. to about 350° C., although optimum extraction is achieved at temperatures at which the fatty acids become more soluble in water, i.e., above 280° C. The upper limit of operating temperature is determined by the temperature at which the side reactions of tocopherols become unacceptable. The resultant organic phase, after cooling to separate out the water, is rich in sterols and valuable tocopherols (Vitamin E) which may be purified by methods known in the prior art.

As noted above, the aqueous extract phase produced from a tall oil extraction may be cooled to separate the extracted fatty acids and resin acids from the water in which they were dissolved. Generally, such acids are essentially insoluble in water at 200° C. so that separation, as by decanting, may be readily achieved at 200° C. or below. The water-free, substantially pure fatty acid and resin acid stream achieved upon such cooling may be further separated into a substantially resin acid-free fatty acid stream and a substantially fatty acid-free resin acid stream by the process of the present invention. It is necessary to effect an operating temperature between about 250° C. and 340° C. in order to achieve both good solubilities ($k_D$'s) and selectivities ($\beta$'s) for separating the resin acids and fatty acids. Streams richer in resin acids (and thus more soluble in water) could be operated at lower temperatures than those richer in fatty acids, and vice versa.

Depending on the composition of the mixture, there will be a relatively narrow temperature range in which the fatty acids will be relatively insoluble and the resin acids relatively soluble in liquid water such that good $k_D$'s and $\beta$'s will be obtained. For example, for a mixture of fatty and resin acids such as would be found in Southern pine tall oil, the operating temperature range would be expected to be between 280° C. and 330° C. This relative difference in solubilities is employed to achieve a separation of resin acids from fatty acids by the process of the present invention. Thus, referring to the apparatus of FIG. 1, a stream containing fatty and resin acids, such as the water-free acid product of the aqueous extract phase produced above, is forced by pump 18 through line 16 to mixing point 24 where it is mixed with the water fed in by line 20. The acid-water mixture is then pumped into equilibrium coil 12 where the water and acid streams are thoroughly mixed and heated to operating temperature. Optimum separation for a fatty and resin acid mixture derived from tall oil is achieved at operating temperatures in the range of about 280° C. through about 330° C. The liquid mixture then passes to view cell 14 where a bottom extract phase 28 and a top raffinate phase 30 are allowed to separate. Because of the lower operating temperatures of this run, the bottom extract phase 28 will contain water, a higher concentration of resin acids, and fatty acids. The top raffinate phase 30 will contain fatty acids, a lesser concentration of resin acids, and water. The two phases are pulled off by lines 32 and 34, respectively, and are allowed to cool. Upon cooling, the acids in each phase, no longer soluble in the now cooled water, may be separated therefrom such as by decanting.

An alternative apparatus for achieving the process of the present invention on a larger, more practical and efficient scale is illustrated schematically in FIG. 2. A conventional countercurrent liquid-liquid extraction column designated generally 100 is illustrated with feed lines 116 and 120 entering same at the bottom and top, respectively, thereof. Means are provided within the column for providing tortuous flow or mechanical agitation in order to achieve sufficient surface to contact the two liquids. Further, means are provided for maintaining the temperature within the column at an appropriate operating temperature depending on the composition of the feed stream and the desired separation. As above, the pressure within the column must be held above the vapor pressure of water at the given operating temperature in order to maintain the water in its liquid state. Thus, looking to FIG. 2, the feed stream containing components for separation enters the column through line 116. Water at elevated temperatures enters the column through line 120. Within the column the two streams are contacted and heated to operating temperature. Two outlet streams in the form of two separate phases are produced. A substantially aqueous extract phase exits the lower end of the column through line 132. The substantially organic raffinate phase exits the upper end of the column through line 134.

Figure 4:
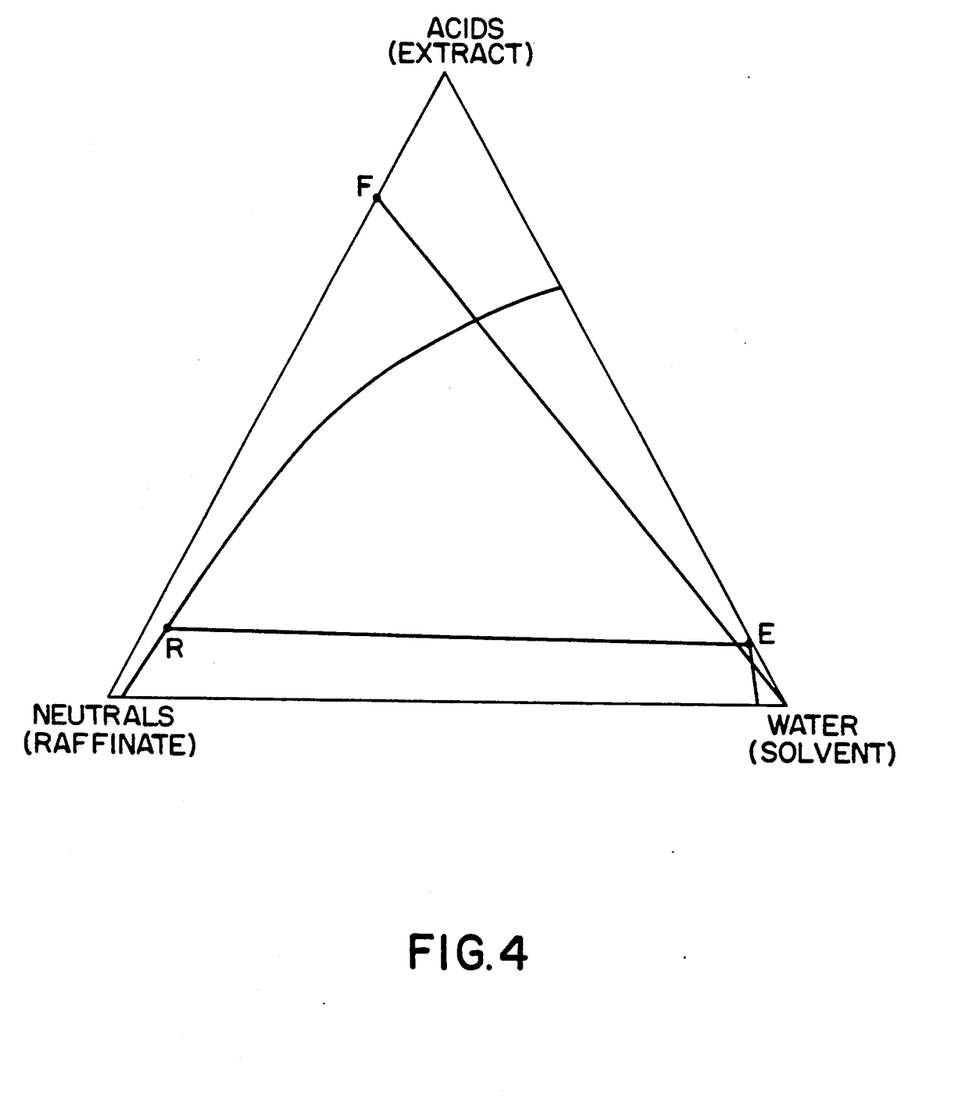
FIG. 4 is a plotted graph representing the multi-stage, countercurrent liquid-liquid solvent extraction of the acids and sterols in tall oil.

Upon exiting the column, the two phases are cooled to below about 200° C. for removal of the water. The composition of each phase will depend on the composition of the initial feed stream and the operating temperature of the run. For example, if a tall oil is fed into the column and the operating temperature is maintained between about 280° C. and about 350° C., the aqueous extract phase will comprise primarily fatty acids, resin acids and water. Upon cooling below about 200° C., the water will separate out, and a substantially pure stream of fatty acids and resin acids will be provided. This separation is illustrated generally by phase separator 150 where, upon cooling below about 200° C., water is pulled off by line 152 and the stream of fatty acids and resin acids exit through line 154. Similarly, the composition of the organic raffinate phase will depend on the composition of the feed stream and the operating temperature. Again, for a tall oil feed stream and temperatures ranging from about 280° C. to about 350° C., the organic phase will comprise primarily sterols and other neutrals, fatty acids and resin acids, and water. Upon cooling in phase separator 160, water will separate out and exit by line 162 while the remaining organic components exit line 164. A qualitative illustration of the column extraction process is shown on a ternary extraction diagram in FIG. 4. Note that the raffinate phase R is rich in neutrals and the extract phase E is rich in water and acids.

Figure 5:
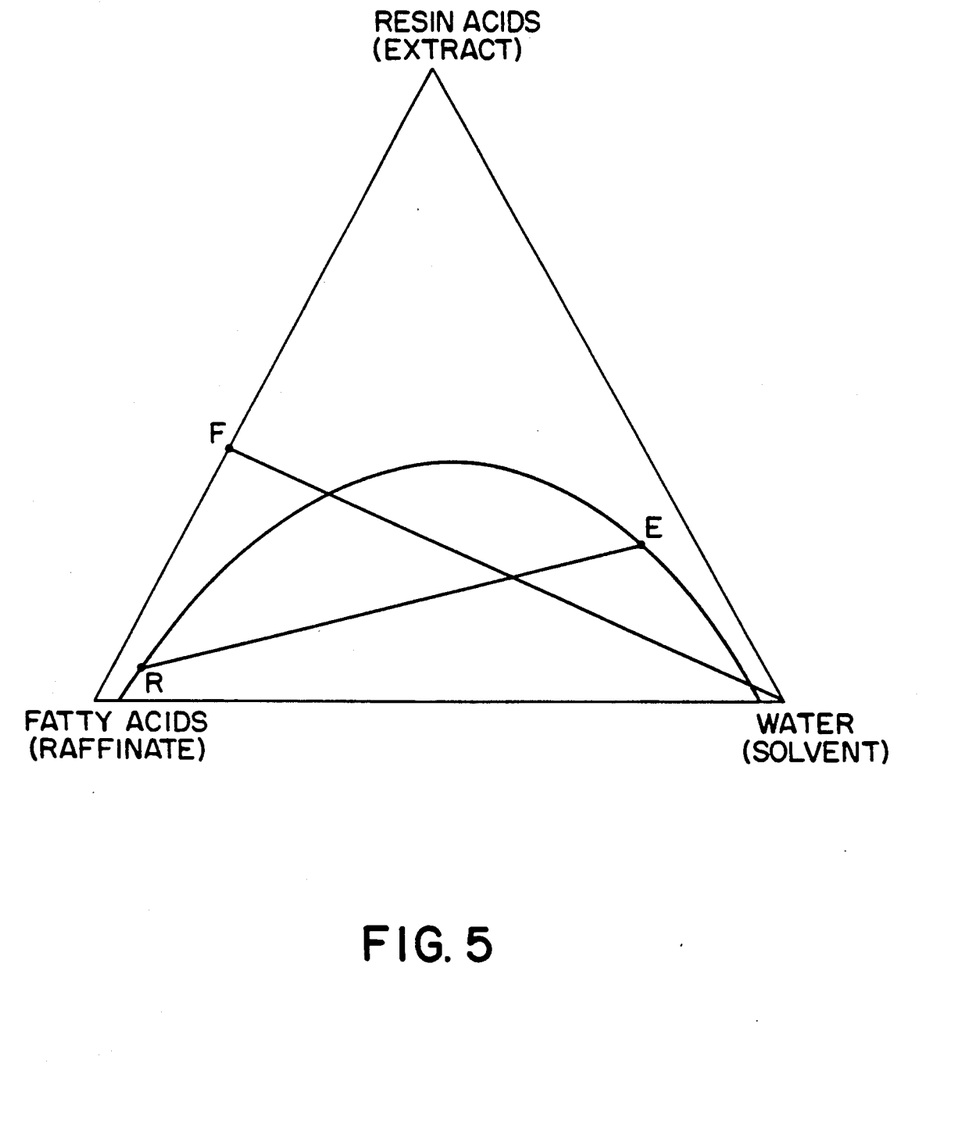
FIG. 5 is a plotted graph representing the multi-stage, countercurrent liquid-liquid solvent extraction of the fatty and resin acids of tall oil.

The apparatus of FIG. 2 is readily adaptable to a continuous system wherein a feed stream such as tall oil may be continually pumped into the liquid-liquid extraction column, and the organic phase may be routed to another process for further purification of the sterols and other neutrals by one of the existing methods described earlier. Similarly, the stream containing relatively pure fatty acids and resin acids carried by line 154 may be routed to another such column for feeding therein as a feed stream and for fatty and resin acid separation by extraction. Again, such separation is carried out at lower operating temperatures ranging from about 280° C. to about 330° C. For such acid separation system, the aqueous extract phase will comprise water and resin acids, while the organic raffinate phase will comprise primarily fatty acids and resin acids not separated out by the run through the column, as well as water. A qualitative illustration of this process is shown on a ternary extraction diagram in FIG. 5. Here the extract phase E is rich in water and resin acids. The raffinate phase R is rich in fatty acids.

Accordingly, it is seen that the countercurrent liquid-liquid extraction column of FIG. 2 lends itself to continuous processes; further, such column may be provided in series with other columns, thereby allowing for further separation of the organic components of both the aqueous and organic phases.

FIG. 2 shows a standard countercurrent liquid-liquid extraction column. However, different operating modes from that shown are also within the scope of the present invention. For example, extract reflux could be used to increase the purity of the extract phase leaving the column. Another possible operating mode would be to operate various stages of the column at different operating temperatures. For example, the column could be operated at a higher temperature at the bottom (to improve acid solubility) and at a lower temperature at the top (to reduce sterol dehydration and esterification).

EXAMPLE 1

Prior to separation in the extraction apparatus of FIG. 1, a Southern pine tall oil sample was washed with hexane to remove lignin and solid matter. The tall oil entered the system by line 16 at a flow rate of 100 mL/h. Water was pumped in through line 20 at a flow rate of 400 mL/h.

The two liquids were mixed and introduced into equilibrium coil 12 for heating and further mixing. The coil was made from three sections of stainless steel tubing with the two end sections, having lengths of approximately 15 m, outer diameters of 1.59 mm and inner diameters of 0.762 mm, connected by a three-meter length of tubing having an outer diameter of 3.18 mm and an inner diameter of 1.59 mm to enhance mixing. If desired, a Kenics-type static mixer of approximately 3/16" o.d. can be used to further enhance mixing. An in-line Type E thermocouple was used to monitor the temperature of the mixture exiting the equilibrium coil.

A nitrogen temperature bath provided heating. The nitrogen bath employed was a forced-convection type bath and was sealed from outside air and surrounded by insulation. Pyrex windows on opposite sides of the bath allowed for observation into the view cell. Heating was achieved by circulating the nitrogen across three Chromalox strip heaters regulated by a Leeds and Northrup controller. Input to the controller was from a 100 ohm platinum resistance thermometer. Thermal gradients within the nitrogen bath were estimated to be ±1 Kelvin.

After exiting the equilibrium coil, the equilibrated, two-phase mixture entered viewing cell 14 for phase separation. The viewing cell employed was a Model 11-T-20 liquid level gauge (Jerguson Gage and Valve Co.) which was modified for high temperature and high pressure operation. The original cell body was replaced with one made from Carpenter 450 stainless steel. The new fluid chamber was machined to the original height and depth but the width was reduced from 1.6 cm to 0.95 cm. The cell windows were made of high-temperature aluminosilicate glass (Corning Glass Works) mounted on graphite gaskets. Mica shields were used to protect the cell windows from the etching effects of water at elevated temperatures. Belleville washers of 17-7 PH stainless steel (Associated Springs, Inc.) were used on the cover plate bolts to compensate for thermal expansion effects and to maintain sealing at elevated temperatures. The internal volume of the cell was approximately 30 mL.

Figure 3:
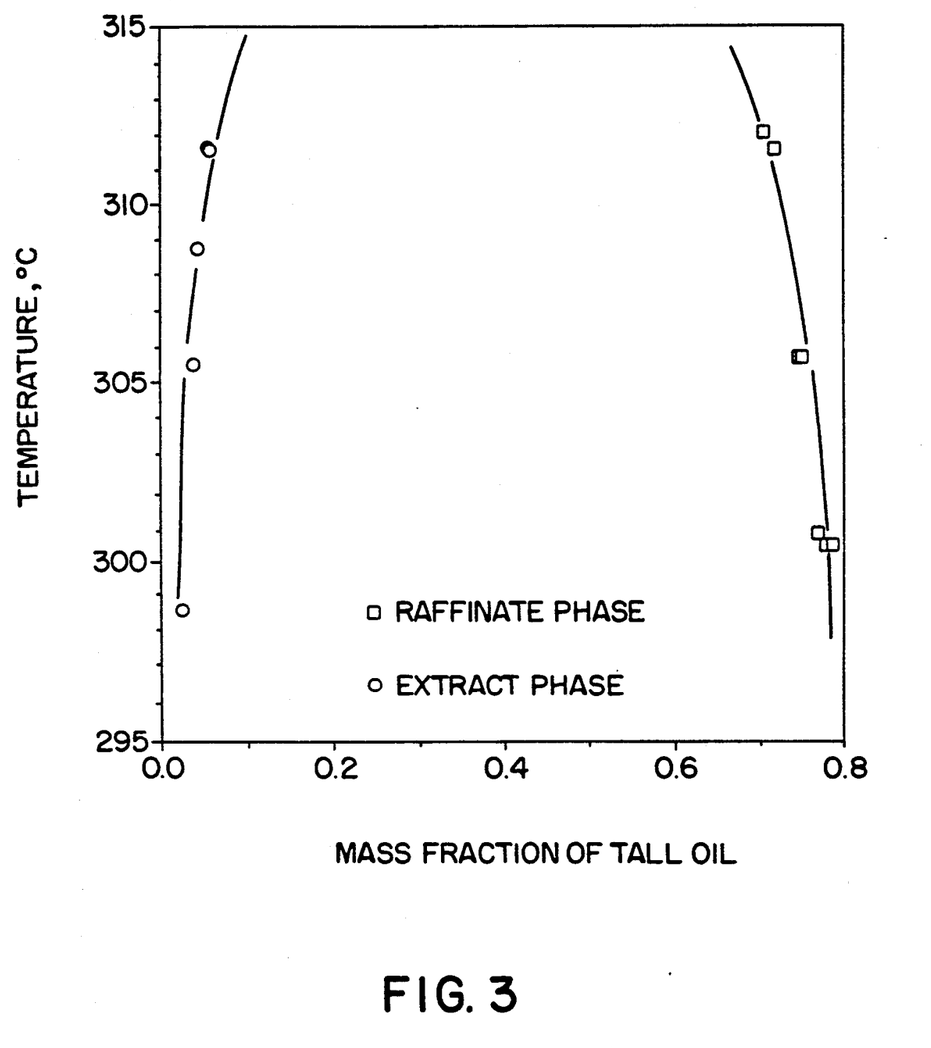
FIG. 3 is a plotted graph representing the solubility of tall oil in the extract and raffinate phases as a function of temperature.

The two phases separated by gravity with the heavier, substantially aqueous extract phase exiting the bottom of the cell by line 32 and the lighter, substantially organic raffinate phase exiting the top of the cell by line 34. The two phases were analyzed for each separate run with FIG. 3 illustrating the mass fraction of tall oil in the respective phases at each temperature. A water-free content for each phase was then calculated.

For three runs, an initial portion of tall oil was divided into three samples. As determined by gas chromatography, each sample had a $\beta$-sitosterol content of 5.6% by weight. The present experiment was performed on each of the samples at three separate temperatures: 301° C., 306° C. and 312° C. After exiting the viewing cell, each phase was analyzed for tall oil content. As shown in FIG. 3, analyses indicate that the bottom extract phase contains from about 3% to 6% by weight tall oil with the remainder being water. The unextracted tall oil remains in the top raffinate phase, which also contains substantial amounts of water at the elevated temperatures of operation (see FIG. 3). As discussed above, this water inhibits undesirable side reactions.

After cooling, the tall oil of each phase was analyzed for $\beta$-sitosterol and total neutrals content. Table I below shows the results of this analysis for each of the three runs. The percent by weight of $\beta$-sitosterol and neutrals is given for each phase on a water-free basis. Other analyses (not shown) also indicated that pitch formation was less than one percent by weight in all cases.

TABLE I

| Temp (°C.) | wt % $\beta$-sitosterol (neutrals) in | | |
|---|---|---|---|
| | Feed | Extract | Raffinate |
| 301 | 5.6 (11.3) | 0.7 (3.8) | 5.5 (13.5) |
| 306 | 5.6 (11.3) | 0.7 (5.5) | 9.3 (13.7) |
| 312 | 5.6 (11.3) | 1.6 (4.7) | 10.5 (17.0) |

The acid numbers of the tall oil feed stream and the two product streams are illustrated in Table II below. Generally, the acid number for a given sample may be interpreted as milligrams of potassium hydroxide required to neutralize one gram of sample to a pH of 10.5 Thus, higher acid numbers indicate higher acid concentrations. The acid numbers below were determined by ASTM D803-65.

TABLE II

| Temp (°C.) | Acid Number in | | |
|---|---|---|---|
| | Feed | Extract | Raffinate |
| 301 | 158.3 | 176.2 | 157.9 |
| 306 | 158.3 | 174.5 | 155.7 |
| 312 | 158.3 | 173.4 | 151.6 |

EXAMPLE 2

A model tall oil was synthesized from $\beta$-sitosterol and oleic acid. The oleic acid used was 92% by weight pure with linoleic and stearic acid impurities. The $\beta$- sitosterol was 90% by weight pure with 10% by weight campesterol. Four samples were prepared with varying β-sitosterol contents as shown in Table III below. The experiment of Example 1 was performed on each of the four samples at 299° C., except that the flow rate of the model tall oil was 175 mL/h and of the water was 200 mL/h. The resulting concentrations of β-sitosterol for each of the product phases on a water-free basis is shown in Table III. The percent by weight of water in each phase is shown in Table IV.

TABLE III

| | wt % β-sitosterol in | | |
|---|---|---|---|
| RUN # | Feed | Extract | Raffinate |
| 1 | 6.5 | 0.5 | 4.8 |
| 2 | 6.5 | 0.5 | 5.2 |
| 3 | 7.6 | 0.5 | 5.9 |
| 4 | 13.0 | 1.0 | 11.0 |

TABLE IV

| | wt % water in | |
|---|---|---|
| RUN # | Extract | Raffinate |
| 1 | 97.5 | 27.2 |
| 2 | 97.5 | 27.4 |
| 3 | 97.5 | 26.4 |
| 4 | 97.7 | 25.0 |

EXAMPLE 3

A neutrals-free model tall oil was synthesized from oleic acid and dehydroabietic acid. The oleic acid was identical to the used in Example 2. The dehydroabietic acid was 85% pure by weight with impurities being other resin acids. The experiment of Example 2 was performed on two samples: one at 299° C. and one at 303° C. The compositions of the feed, extract, and raffinate phases on a water-free basis are shown below.

TABLE V

| | wt. % dehydroabietic acid in | | |
|---|---|---|---|
| Temp (°C.) | Feed | Extract | Raffinate |
| 298 | 16.6 | 28.9 | 15.2 |
| 303 | 16.6 | 26.0 | 15.2 |

The percent by weight of water in each phase is shown in Table VI.

TABLE VI

| | wt % water in | |
|---|---|---|
| Temp (°C.) | Extract | Raffinate |
| 298 | 97.5 | 28.4 |
| 303 | 96.2 | 32.6 |

EXAMPLE 4

The experiment of Example 1 was performed on two samples of a deodorized distillate of soybean oil. The flow rate of the distillate was 150 mL/h and of the water was 225 mL/h. One sample was extracted at 298° C.; the other at 307° C. A comparison of the fatty acid, tocopherol, and sterol levels in the feed, extract, and raffinate phases on a water-free basis is shown below in Tables VII and VIII. Analysis of the sterols, tocopherols and fatty acids was by gas chromatography. The percent by weight of water in each phase is shown in Table IX.

TABLE VII

| | $\frac{\text{wt. fatty acids}}{\text{wt. tocopherols}}$ in | | |
|---|---|---|---|
| Temp (°C.) | Feed | Extract | Raffinate |
| 298 | 2.1 | 31.1 | 2.3 |
| 307 | 2.1 | 18.9 | 2.2 |

TABLE VIII

| | $\frac{\text{wt. fatty acids}}{\text{wt. sterols}}$ in | | |
|---|---|---|---|
| Temp (°C.) | Feed | Extract | Raffinate |
| 298 | 2.5 | 27.8 | 2.6 |
| 307 | 2.5 | 37.3 | 2.5 |

TABLE IX

| | wt % water in | |
|---|---|---|
| Temp (°C.) | Extract | Raffinate |
| 298 | 97.8 | 14.8 |
| 307 | 97.7 | 18.0 |

These and other modifications and variations to the present invention may be practiced by those of ordinary skill in the art, without departing from the spirit and scope of the present invention, which is more particularly set forth in the appended claims. Furthermore, those of ordinary skill in the art will appreciate that the foregoing description is by way of example only, and is not intended to be limitative of the invention so further described in such appended claims.

What is claimed is:

1. A method of solvent extraction for separating the components of a primary stream containing components insoluble in liquid water at room temperature, at least one of said components having a polar substituent group, comprising:
   contacting the stream with liquid water at an elevated temperature at which said at least one component is water soluble;
   removing a raffinate phase stream; and
   removing an extract phase stream having an increased concentration of said at least one component.

2. A method of solvent extraction for separating the components of a primary stream containing fatty acids, comprising:
   contacting the stream with liquid water at temperatures ranging from about 250° C. to about 360° C.;
   removing a raffinate phase stream; and
   removing an extract phase stream.

3. A method as in claim 2 wherein said primary stream further includes nonsaponifiable components.

4. A method as in claim 3, further comprising:
   cooling said raffinate phase stream to a temperature at which said nonsaponifiable components and acids are essentially immiscible with said liquid water to separate said liquid water therefrom.

5. A method as in claim 3, further comprising:
   cooling said extract phase stream to a temperature at which said acids and nonsaponifiable components are essentially immiscible with said liquid water to separate said liquid water therefrom.

6. A method as in claim 4 wherein said nonsaponifiable components include sterols.

7. A method as in claim 6, further comprising:

recovering sterols from said water-free raffinate stream.

8. A method as in claim 4 wherein said nonsaponifiable components include tocopherols.

9. A method as in claim 8, further comprising:
recovering tocopherols from said water-free raffinate stream.

10. A method of solvent extraction for separating the components of a primary stream containing resin acids, comprising:
contacting the stream with liquid water at temperatures ranging from about 250° C. to about 360° C.;
removing a raffinate phase stream; and
removing an extract phase stream.

11. A method as in claim 10 wherein said primary stream further includes nonsaponifiable components.

12. A method as in claim 11 further comprising:
cooling said raffinate phase stream to a temperature at which said nonsaponifiable components and acids are essentially immiscible with said liquid water to separate said liquid water therefrom.

13. A method as in claim 11, further comprising:
cooling said extract phase stream to a temperature at which said acids and nonsaponifiable components are essentially immiscible with said liquid water to separate said liquid water therefrom.

14. A method as in claim 12 wherein said nonsaponifiable components include sterols.

15. A method as in claim 14, further comprising:
recovering sterols from said water-free raffinate stream.

16. A method as in claim 12 wherein said nonsaponifiable components include tocopherols.

17. A method as in claim 16, further comprising:
recovering tocopherols from said water-free raffinate stream.

18. A method of solvent extraction for separating the components of a tall oil stream containing fatty acids, resin acids, and nonsaponifiable components, said nonsaponifiable components including sterols, comprising:
contacting the tall oil stream with liquid water at temperatures ranging from about 250° C. to about 360° C.; and
producing two phases, a first phase comprising tall oil having liquid water dissolved therein, said tall oil having an increased concentration of nonsaponifiable components and a second phase comprising water having extracted fatty acids and resin acids dissolved therein.

19. A method as in claim 18 wherein said tall oil stream is contacted with said liquid water at temperatures ranging from about 280° C. to about 350° C.

20. A method as in claim 18 wherein said tall oil stream is countercurrently contacted with said liquid water in a liquid-liquid extraction device.

21. A method as in claim 18, further comprising:
cooling said first phase to a temperature at which said tall oil is essentially immiscible with said liquid water to separate said liquid water therefrom.

22. A method as in claim 18, further comprising:
cooling said extract phase stream to a temperature at which said tall oil is essentially immiscible with said liquid water to separate said liquid water therefrom.

23. A method as in claim 21, further comprising:
recovering sterols from said tall oil.

24. A method for recovering tocopherols from a deodorized distillate by-product of the deodorization of vegetable oils, said distillate comprising fatty acids and tocopherols, comprising:
contacting a stream of said distillate with liquid water at temperatures ranging from 250° C. to 350° C.;
removing a raffinate phase stream having a relatively high concentration of tocopherols;
removing an extract phase stream having a relatively high concentration of fatty acids; and
cooling said raffinate phase stream to a temperature at which said distillate is essentially immiscible with said liquid water to separate said liquid water therefrom.

25. A method as in claim 24 wherein said distillate stream is contacted with liquid water at temperatures ranging from about 280° C. to about 350° C.

26. A method as in claim 24, further comprising:
cooling said extract phase stream to a temperature at which said distillate is essentially immiscible with said liquid water to separate said liquid water therefrom.

27. A method for producing a sterol-enriched stream from crude tall oil, comprising:
bringing tall oil into contact with liquid water at a temperature in a range of from about 250° C. to about 360° C. at a pressure greater than the vapor pressure of water at said temperature;
producing two liquid phases therefrom, the first of said two phases being a substantially aqueous phase comprising primarily said liquid water having dissolved therein fatty acids and resin acids extracted from said tall oil, and the second of said two phases being a substantially organic phase comprising primarily said tall oil having a high concentration of sterols resulting from said extraction of said fatty acids and resin acids, said tall oil further having liquid water dissolved therein; and
separating said two phases.

28. A method as in claim 27 wherein said tall oil is contacted with liquid water at temperatures ranging from about 280° C. to about 350° C.

29. A method for recovering sterols from a feed stream comprising acids and nonsaponifiable components, said nonsaponifiable components including sterols, comprising:
contacting said feed stream with liquid water at temperatures ranging from 250° C. to 360° C.;
removing a raffinate phase stream having a relatively high concentration of nonsaponifiable components;
cooling said raffinate phase stream to a temperature at which said feed stream is immiscible with said liquid water to separate said liquid water therefrom; and
further processing said raffinate stream to isolate said sterols.

30. A method as in claim 29 wherein said feed stream is contacted with liquid water at temperatures ranging from about 280° C. to about 350° C.

31. A method for recovering resin acids from a feed stream comprising resin acids and fatty acids, comprising:
contacting said feed stream with liquid water at temperatures ranging from about 250° C. to about 340° C.;
removing a raffinate phase having a relatively high concentration of fatty acids; and
removing an extract phase having a relatively high concentration of resin acids.

32. A method as in claim 31 wherein said feed stream is contacted with said liquid water at temperatures ranging from about 280° C. to about 330° C.

* * * * *